US012717485B2

(12) United States Patent
Jo

(10) Patent No.: US 12,717,485 B2
(45) Date of Patent: Aug. 25, 2026

(54) SYSTEM AND METHOD OF INTER/INTRA-MEMORY TIERING

(71) Applicant: Samsung Electronics Co., Ltd., Gyeonggi-do (KR)

(72) Inventor: Myung Hyun Jo, Granite Bay, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 18/952,207

(22) Filed: Nov. 19, 2024

(65) Prior Publication Data

US 2025/0363046 A1 Nov. 27, 2025

Related U.S. Application Data

(60) Provisional application No. 63/650,090, filed on May 21, 2024.

(51) Int. Cl.
*G06F 3/06* (2006.01)
*G06F 12/0868* (2016.01)
*G06F 13/16* (2006.01)

(52) U.S. Cl.
CPC .......... *G06F 3/0611* (2013.01); *G06F 3/0647* (2013.01); *G06F 3/0685* (2013.01); *G06F 12/0868* (2013.01); *G06F 13/1668* (2013.01)

(58) Field of Classification Search
CPC ............. G06F 12/0246; G06F 12/0882; G06F 13/1668; G06F 12/08; G06F 12/0868; G06F 12/0888; G06F 2212/1044; G06F 2212/205; G06F 2212/225; G06F 2212/283; G06F 2212/502; G06F 2212/7202
See application file for complete search history.

(56) References Cited

U.S. PATENT DOCUMENTS 10,817,203 B1 10/2020 Anand et al.
2012/0278569 A1* 11/2012 Kawakami ............ G06F 3/0653 711/E12.103
2020/0151098 A1* 5/2020 Bruce ................. G06F 12/0811
2020/0356300 A1* 11/2020 Mahajan ............... G06F 3/0649
2022/0050722 A1 2/2022 Dugast et al.
2022/0113915 A1 4/2022 Ki et al.
2022/0261268 A1* 8/2022 Kodama ............. G06F 9/45558
2023/0044342 A1 2/2023 Wilkinson
2023/0093247 A1 3/2023 Kumar et al.
(Continued)

FOREIGN PATENT DOCUMENTS

CN 117827464 4/2024
EP 4 020 243 12/2020
EP 4 266 181 10/2023

OTHER PUBLICATIONS

European Search Report dated Oct. 10, 2025 issued in counterpart application No. 25175638.3-1218, 11 pages.

*Primary Examiner* — Jane W Benner
(74) *Attorney, Agent, or Firm* — The Farrell Law Firm, P.C.

(57) ABSTRACT

A system and method for perform inter/intra-memory tiering are provided. The system includes a host CPU; a tier 1 memory; and a memory module including a tier 2 memory and a tier 3 memory. The memory module is configured to perform inter-memory tiering between the tier 1 memory and the memory module, and perform intra-memory tiering between the tier 2 memory and the tier 3 memory.

20 Claims, 4 Drawing Sheets

(56) References Cited

U.S. PATENT DOCUMENTS

2023/0185740 A1 6/2023 Nguyen et al.
2023/0393744 A1 12/2023 Meeramohideen Mohamed et al.
2024/0070065 A1* 2/2024 Hoang ................ G06F 12/0292
2024/0070072 A1 2/2024 Roberts
2024/0143389 A1 5/2024 Teterevkov et al.

* cited by examiner

SYSTEM AND METHOD OF INTER/INTRA-MEMORY TIERING

CROSS-REFERENCE TO RELATED APPLICATION

This application claims the priority benefit under 35 U.S.C. § 119(e) of U.S. Provisional Application No. 63/650,090, which was filed on May 21, 2024, the disclosure of which is incorporated by reference in its entirety as if fully set forth herein.

BACKGROUND

1. Field

The present disclosure relates generally to memory tiering, and more particularly, to a system and method of inter/intra-memory tiering between a host system or an embedded central processing unit (CPU) and a memory module, such as a compute express link (CXL) memory module (CMM), which improves computing capabilities of the host system or the embedded CPU by reducing operational overhead related to memory tiering.

2. Description of Related Art

A warehouse-scale computer (WSC) refers to a hierarchically organized system with a large number of processors that are capable of exploiting both request-level and data-level parallelism. These systems form the backbone of the cloud infrastructure and are part of the fundamental infrastructure behind Internet services that billions of people use daily, such as search engines, social networks, online maps, video sharing platforms, online shopping websites, email services, etc.

However, in thousands of nodes, cold data with little access frequency from each application occurs on average at about 25%, and placing cold data in expensive memory such as dynamic random access memory (DRAM) increases total cost of ownership (TCO).

Accordingly, to address these types of issues memory hierarchies depending data access frequency have been used to optimize TCO.

More specifically, existing memory tiering mainly focuses on dividing data temperature into two categories, i.e., hot and cold, and locating two tiered memories, e.g., DRAM and flash memory, such as NAND flash. That is, hot data is preferably stored in the more expensive DRAM, i.e., a Tier 1 memory, and cold data is preferably stored in the less expensive NAND flash, i.e., a Tier 2 memory.

However, the types of in-memory data needed in WSCs are diverse and their size is constantly increasing. As a result, merely limiting data temperature to hot and cold classifications and utilizing two tiers of memory is not sufficient to achieve optimized TCO.

SUMMARY

Accordingly, an aspect of the disclosure is to provide a system and method for efficiently classifying multiple data temperatures for various workloads and effectively placing them to tiered memory considering characteristics of tiered memory.

Another aspect of the disclosure is to provide a system and method that can configure multiple inter/intra-memory tiering ways with multiple page tracking methods in parallel.

Another aspect of the disclosure is to provide a system and method that can customize tiering skills considering the performance and endurance characteristics of tiered memory.

In accordance with an aspect of the disclosure, a system is provided for performing inter/intra-memory tiering. The system includes a host CPU; a tier 1 memory; and a memory module including a tier 2 memory and a tier 3 memory. The memory module is configured to perform inter-memory tiering between the tier 1 memory and the memory module, and perform intra-memory tiering between the tier 2 memory and the tier 3 memory.

In accordance with another aspect of the disclosure, a method is provided for inter/intra-memory tiering by a memory module. The method includes receiving, from a host CPU, a first configuration for inter-memory tiering between a tier 1 memory and the memory module; receiving, from a CPU included in the memory module, a second configuration for intra-memory tiering between a tier 2 memory and a tier 3 memory, the tier 2 memory and the tier 3 memory being included in the memory module; tracking page meta of a memory page; and performing, for the memory page, one of inter-memory tiering between the tier 1 memory and the memory module, or intra-memory tiering between the tier 2 memory and the tier 3 memory, based on the first configuration or the second configuration, respectively, and the tracked page meta.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1:
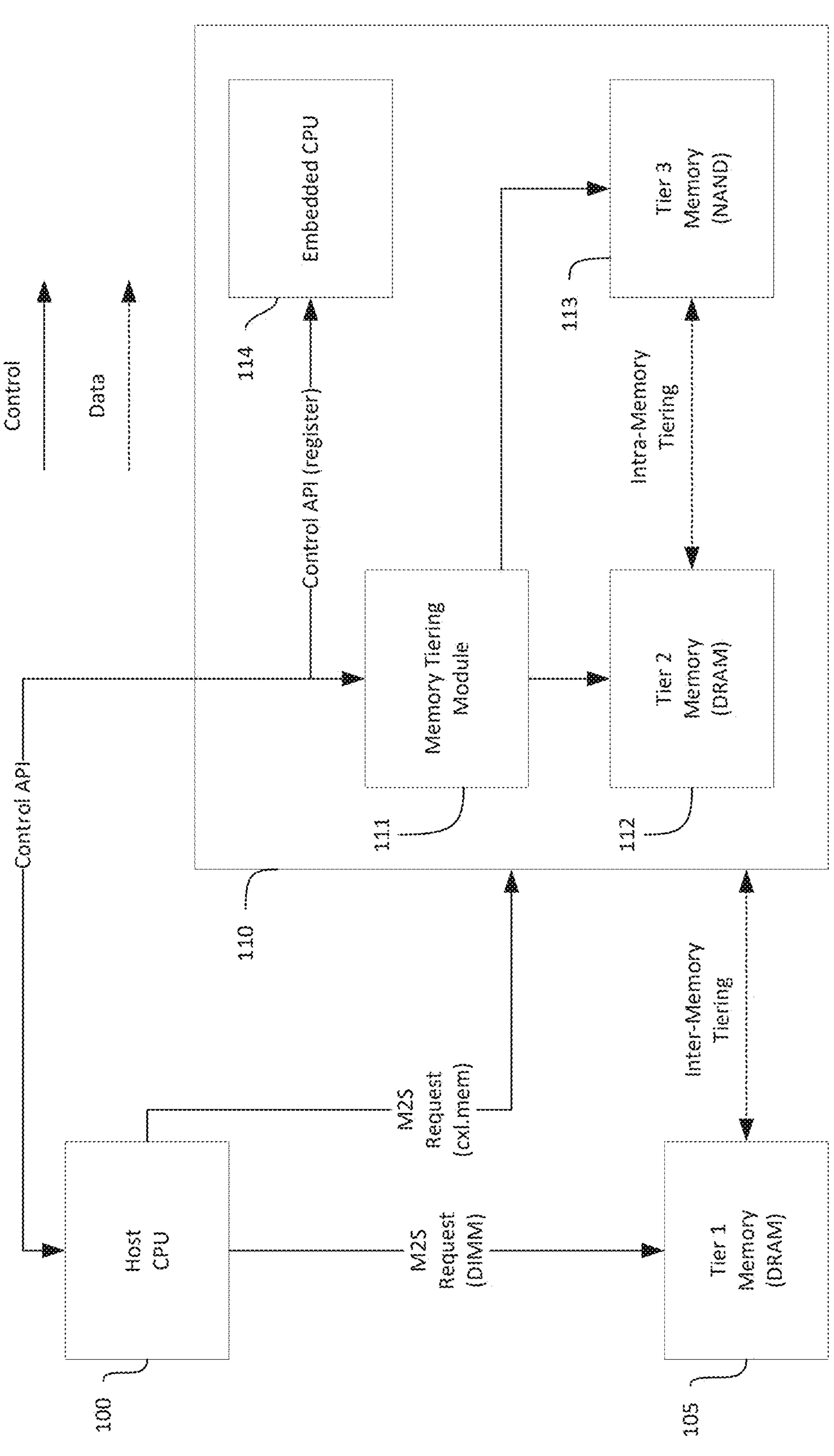
FIG. 1 illustrates an inter/intra-memory tiering system according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration."

Any embodiment described herein as "exemplary" is not to be construed as necessarily preferred or advantageous over other embodiments.

Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form.

It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

When an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

In the descriptions herein, reference is made to a variety of controllers, units, and blocks. Any of these controllers, units, and/or blocks may be embodied by a processor that executes a particular dedicated set of software instructions, such as a software module. The processor executes the instructions to control operations of the controller(s), unit(s) and/or blocks. Multiple of the controllers, units and blocks may be defined by a single common processor and different dedicated sets of software instructions. Any processor of a controller, unit or block described herein is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor is configured to execute software instructions in order to perform functions as described in the various embodiments herein. A processor may be a general-purpose processor or may be part of an application specific integrated circuit (ASIC). A processor may also be a microprocessor, a microcomputer, a processor chip, a controller, a microcontroller, a digital signal processor (DSP), a state machine, or a programmable logic device. A processor may also be a logical circuit, including a programmable gate array (PGA) such as a field programmable gate array (FPGA), or another type of circuit that includes discrete gate and/or transistor logic. A processor may be a CPU, a graphics processing unit (GPU), or both. Additionally, any processor described herein may include multiple processors, parallel processors, or both. Multiple processors may be included in, or coupled to, a single device or multiple devices. Sets of instructions can be read from a computer-readable medium. Further, the instructions, when executed by a processor, can be used to perform one or more of the methods and processes as described herein. In a particular embodiment, the instructions may reside completely, or at least partially, within a main memory, a static memory, and/or within a processor during execution.

Dedicated hardware implementations, such as ASICs, programmable logic arrays and other hardware components, can be constructed to implement one or more of the controller(s), unit(s) and/or block(s) described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

As described above, the current two-level memory tiering is not sufficient for the current needs of WSCs.

In particular, if one tiered memory is a long-latency memory such as flash memory, it is difficult to satisfy high quality of service (QoS) with only access frequency-based data temperature classification and page migration. It is required some prediction algorithms to early prefetch high temperature data In addition, to consider the effective endurance of flash memory, swapped out pages should be deleted from the solid state device (SSD). Additionally, write bandwidth should be regulated considering the endurance of flash memory.

Further, write amplification caused by a unit difference between CXL (64B) and SSD (4 KB) should be considerably reduced.

Since data temperatures are dependent upon workload characteristics, a detection algorithm should be customized according to the workload characteristics and logical memory device of an application mainly used by the customer. For example, some hot data can be defined by access frequency for certain workload, but in other applications hot data can be classified by recency information. Thus, a data temperature detection algorithm should be dynamically controlled according to workload characteristics.

FIG. 1 illustrates an inter/intra-memory tiering system according to an embodiment.

Referring to FIG. 1, the system includes a host CPU 100, a tier 1 memory 105, e.g., DRAM, and a memory module 110, e.g., a CMM. The memory module 110 includes a memory tiering module 111, a tier 2 memory 112, e.g., DRAM, a tier 3 memory 113, e.g., NAND flash, and an embedded CPU 114.

Herein, inter-memory tiering generally includes hot page promotion from the memory module 110 to the tier 1 memory 105 and warm page demotion from the tier 1 memory 105 to the memory module 110. Intra-memory tiering generally includes warm page promotion from the tier 3 memory 113 to the tier 2 memory 112 and cold page demotion from the tier 2 memory 112 to the tier 3 memory 113. During inter/intra-memory tiering the memory module 110 tracks access frequency for each memory page and classifies hot/warm/cold pages. Each page temperature level and report cycle are defined by the host CPU 100 or the embedded CPU 114, and are repeatedly performed using operations defined by the memory module 110.

More specifically, the memory module 110, i.e., memory tiering module 111 therein, provides independent operation for multiple tiering instances internally. For example, the host CPU 100 can request page tracking to promote hot data of the memory module 110 to the tier 1 memory 105 for inter-memory tiering, i.e., memory tiering between the tier 1 memory 105 and the memory module 110. Since the host CPU 100 is not interested in the internal operations of the memory tiering module 111 relating to the tier 2 memory 112 and the tier 3 memory 113, hot page promotion to the tier 1 memory 105 should be possible regardless of their intra-memory tiering, i.e., memory tiering between the tier 2 memory 112 and the tier 3 memory 113. Conversely, since intra-memory tiering between the tier 2 memory 112 and the tier 3 memory 113 should be performed independently of page promotion to the tier 1 memory 105, the memory module 110 may perform multiple independent operations.

The host CPU 100 may configure inter-memory tiering using a control application programming interface (API) via CXL.io or mailbox. When the host CPU 100 sends master to superordinate (M2S) requests (e.g., MemRd, MemRdData, MemSpecRd, MemWr, etc.) to access the memory module 110 via CXL.mem, the memory tiering module 111 will track access frequency per memory page according to the configuration. If access frequency of some pages is greater than a hot frequency threshold, the memory tiering module 111 reports the hot pages to the host CPU 100 (hot page promotion). If the host CPU 100 previously configures the tier 1 memory 105 to promote, the memory tiering module 111 can directly move the hot page to the tier 1 memory 105, e.g., via CXL.cache. Additionally, to effectively manage space availability of the tier 2 memory 112 or endurance of the tier 3 memory 113, the host CPU 100 may clear the promoted pages from the memory module 110.

In addition, the embedded CPU 114 can configure intra-memory tiering via a register. If the tier 2 memory 112 is filled above a configured resource full watermark, the memory tiering module 111 may attempt to demote some cold pages according to an eviction algorithm such as least recently used (LRU), least frequently used (LFU), or adaptive replacement cache (ARC). Also, if some pages in the tier 2 memory 112 have not been accessed until the time of cold age threshold, the pages may be demoted to the tier 3 memory 113 (cold page demotion).

In this case, the memory tiering module 111 may regulate write bandwidth to secure NAND endurance. In contrast, if a page in the tier 3 memory 113 is accessed frequently, above a warm frequency threshold, the accessed page, as well as consecutive pages, e.g., according to temporal locality or spatial locality, may be directly promoted to the tier 2 memory 112 at the time of warm page threshold (warm page promotion). For example, if a page N is accessed above the warm frequency threshold, consecutive pages N+1, N+2 etc., may also be directly promoted to the tier 2 memory 112.

Although FIG. 1 is described as above with reference to access frequency being used as the tracked page meta the disclosure is not limited thereto. For example, other page meta such as recency, file type, etc., or a combination of any thereof may also be utilized for classifying hot/warm/cold pages.

Table 1 below provides an example of 13 APIs for use in inter/intra-memory tiering methods that can be used by the host CPU 100 and/or the embedded CPU 114. Each API is independent for each memory tiering instance, which may be distinguished by TIERING_ID.

TABLE 1

| | Types | # | Interfaces |
|---|---|---|---|
| Host-driven Inter/Intra memory tiering API | Init | 1 | Initialize(TIERING__ID, memory__start__address, memory__size, page__granularity) |
| | Tracker | 2 | SetPageTracking(TIERING__ID, tracking__M2S__request__list, down__sampling__factor, max__access__frequency, reset__age (second)) |
| | Reactive Policies | 3 | SetMemoryFullWatermark(TIERING__ID, full__watermark(1~100)) |
| | | 4 | SetLoadMissPages(TIERING__ID, page__size) |
| | | 5 | SetEvictionMethod(TIERING__ID, method (LRU, LFU, ARC)) |

TABLE 1-continued

| Types | # | Interfaces |
|---|---|---|
| Proactive Policies | 6 | SetProactiveDemotion(TIERING_ID, target_temperature_level (warm or cold), age_threshold (second), frequency_threshold, demotion_page_size, enable_remaining_endurance_consideration, enable_direct_move, lower_tier_memory_address) |
| | 7 | Pages GetDemotionCandidatePages(TIERING_ID) |
| | 8 | SetProactivePromotion(TIERING_ID, target_temperature_level (hot or warm), age_threshold (second), frequency_threshold, promotion_page_size, enable_direct_move, upper_tier_memory_address) |
| | 9 | Pages GetPromotionCandidatePages(TIERING_ID) |
| Manual Operations | 10 | PreLoadPages(TIERING_ID, page_start_idx, page_size) |
| | 11 | ClearPromotedPages(TIERING_ID, page_start_idx, page_size) |
| Telemetry | 12 | GetMissRate(TIERING_ID) |
| | 13 | GetHitRate(TIERING_ID) |

The multiple tiering instances as illustrated in FIG. 1 can distinguish/isolate page tracking and page migration policy and provide an algorithm for diverse workloads and applications. As a result, parallel processes as illustrated in FIG. 1 make the system easily scalable to multiple data temperatures and multiple layers of memory.

Also, each tiering instance allows page tracking using host-side profiling over CXL.cache or using device-side profiling over CXL.mem.

Figure 2:
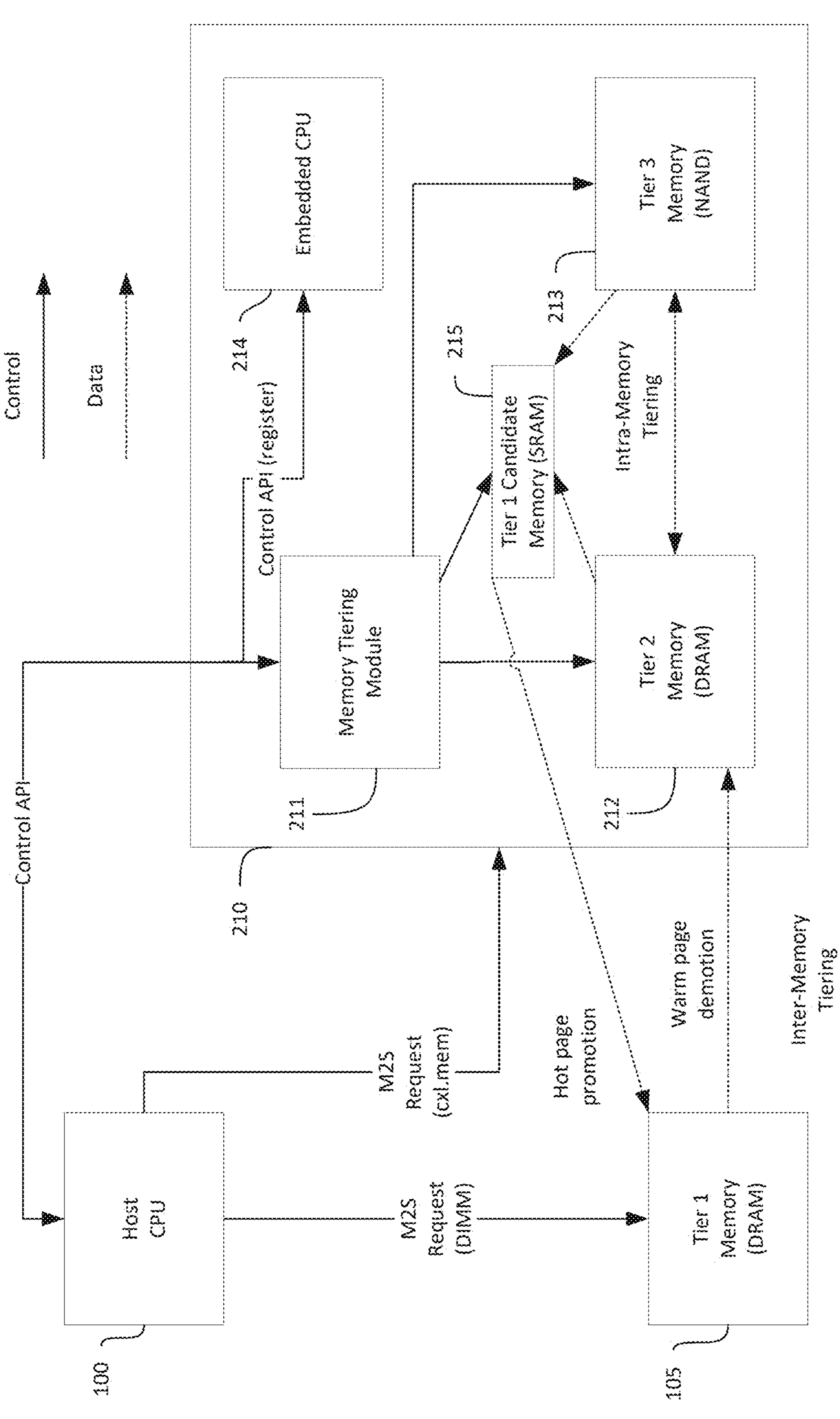
FIG. 2 illustrates an inter/intra-memory tiering system according to an embodiment.

FIG. 2 illustrates an inter/intra-memory tiering system according to an embodiment.

Referring to FIG. 2, similar to FIG. 1, the system includes a host CPU 100, a tier 1 memory 105, e.g., DRAM, and a memory module 210, e.g., a CMM. As the host CPU 100 and a tier 1 memory 105 elements have already been described with reference to FIG. 1, a repeat description will be omitted here.

The memory module 210 includes a memory tiering module 211, a tier 2 memory 212, e.g., DRAM, a tier 3 memory 213, e.g., NAND flash, an embedded CPU 214, and tier 1 candidate memory 215, e.g., static random access memory (SRAM). The memory module 210, the memory tiering module 211, the tier 2 memory 212, the tier 3 memory 213, and the embedded CPU 214 operate in the same fashion as the memory module 110, the memory tiering module 111, the tier 2 memory 112, the tier 3 memory 113, and the embedded CPU 114, as described above with reference to FIG. 1.

The tier 1 candidate memory 215 is provided to allow hot candidate removal from the tier 2 memory 212 and the tier 3 memory 213. More specifically, when a page is identified by memory tiering module 211 as a hot candidate page, e.g., using histogram of access frequency, the page may be removed from the tier 2 memory 212 or the tier 3 memory 213 for availability and endurance. That is, the page may be removed from the tier 2 memory 212 or the tier 3 memory 213 and temporarily stored in the tier 1 candidate memory 215 before being hot promoted to the tier 1 memory 105.

Figure 3:
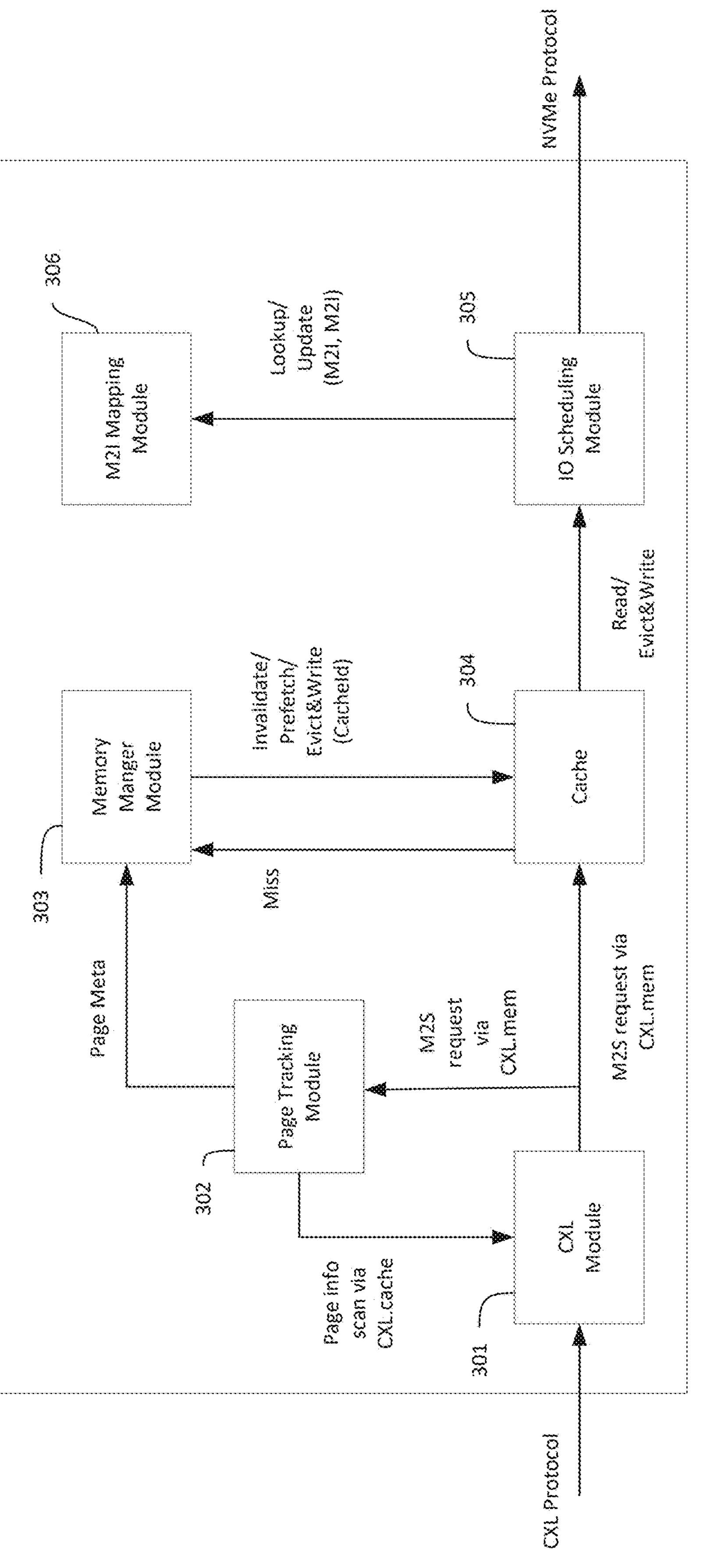
FIG. 3 illustrates a memory tiering module according to an embodiment.

FIG. 3 illustrates a memory tiering module according to an embodiment. For example, the memory tiering module 111 of FIG. 1 and/or the memory tiering module 211 of FIG. 2 may be configured as illustrated in FIG. 3.

Referring to FIG. 3, the memory tiering module includes a CXL module 301, a page tracking module 302, a memory manger module 303, a cache 304, an input/output (IO) scheduling module 305, and a memory to IO (M2I) mapping module 306. Each of the modules in FIG. 3 may be configured using hardware, software, or combination thereof.

The CXL module 301 provides functions (CXL.io, CXL.mem, and CXL.cache) of CXL standards in a Link/Transport layer. For example, CXL.mem allows a host to expand additional memory based on a load/store architecture.

The page tracking module 302 tracks meta (e.g., access frequency and/or recency) per page meta. The tracking may be event-driven or periodically performed scan, e.g., according to page meta design.

The memory manger module 303 controls page migration between tier 2 and tier 3 memories, e.g., the tier 2 memory 112 and the tier 3 memory 113. The memory manger module 303 may perform proactive cold-page demotion (e.g., LRU, LFU, or ARC), reactive warm-page prefetch (temporal vs. spatial locality), e.g., in response to a particular event, such as a cache miss, and/or proactive hot-page promotion (e.g., using a histogram of access frequency). For example, when a cache is missed, a missed page is loaded from tier 3 to tier 2 as well as prefetched predicted warm pages using a page access pattern according to temporal locality or spatial locality.

The cache 304 manages data located to a tier 2 memory, e.g., manages placement (N-way set associative vs hash-chain).

IO scheduling module 305 proceeds SSD operations, e.g., using a storage access and transport protocol such as non-volatile memory express (NVMe), and performs endurance consideration (e.g., write regulation, page elimination, etc.).

The M2I mapping module 306 manages the mapping information between memory and SSD. For example, the M2I mapping module 306 may manage a mapping between a memory address and an SSD address to reduce write amplification and the IO scheduling module 305 may throttle a write bandwidth depending on remaining endurance.

More specifically, to write data to an SSD, a memory address should be converted to an SSD IO address. The M2I mapping module 306 can manage the life cycle of how many times the total capacity of the SSD has been written each time the address conversion is performed. According to the remaining life cycle of the SSD, the IO scheduling module 305 can adjust the write bandwidth to ensure the warranty of the SSD. Generally, the SSD provides 1 drive writes per day (DWPD), and when the SSD capacity is 4 TB, only 4 TB of data can be written per day to guarantee 5 years. Therefore, in order to support this warranty, the write bandwidth should be adjusted according to the remaining life cycle.

Figure 4:
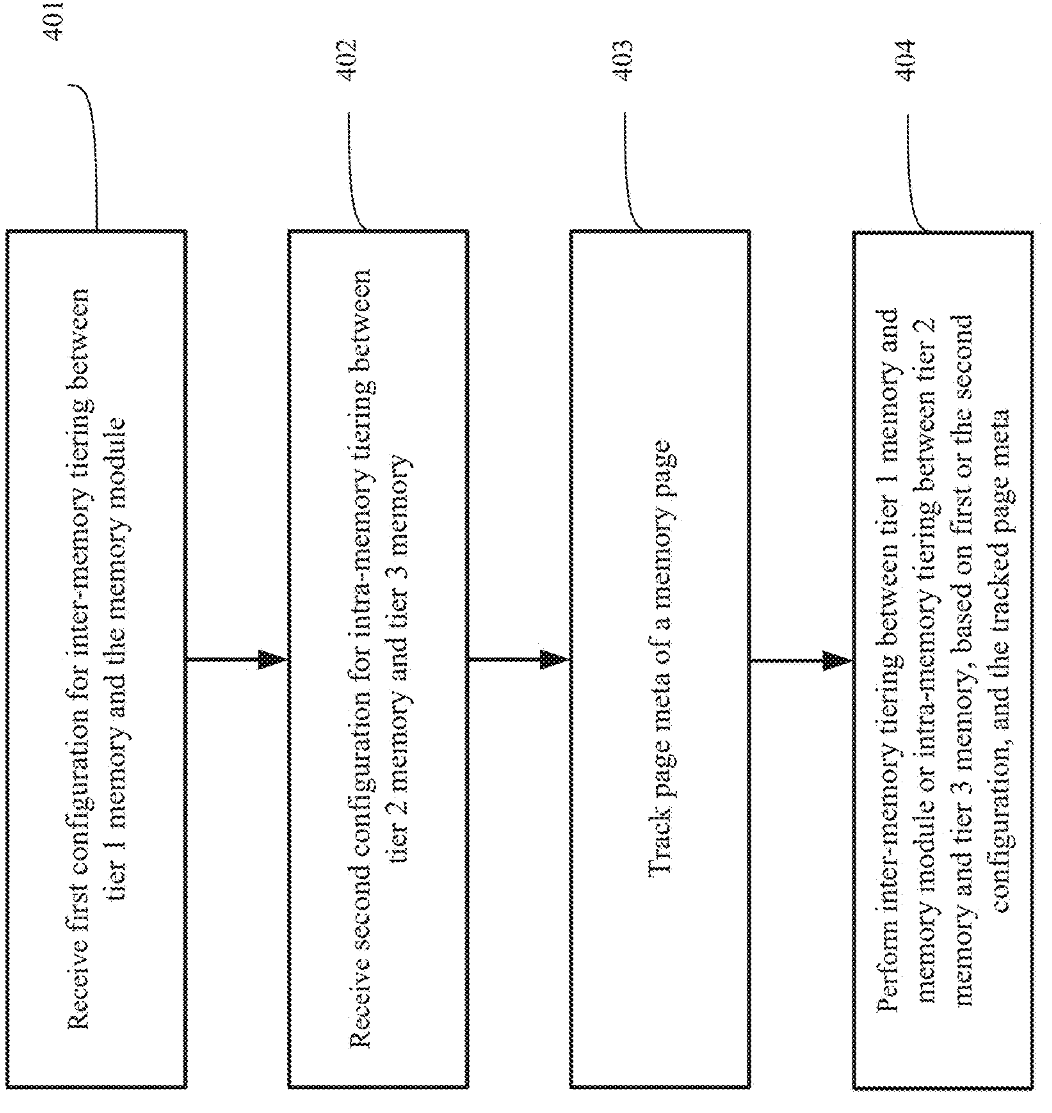
FIG. 4 is a flow chart illustrating a method performed in an inter/intra-memory tiering system according to an embodiment.

FIG. 4 is a flow chart illustrating a method performed in an inter/intra-memory tiering system according to an embodiment. For example, the method of FIG. 4 is described below with reference to the inter/intra-memory tiering system of FIG. 1. However, the method of FIG. 4 is not limited thereto.

Referring to FIG. 4, in step 401, the memory module 110 receives, from host CPU 100, a first configuration for inter-memory tiering between tier 1 memory 105 and the memory module 110.

In step 402, the memory module 110 receives, from a CPU included in the memory module, i.e., embedded CPU 114, a second configuration for intra-memory tiering between tier 2 memory 112 and tier 3 memory 113, which are included in the memory module 110.

In step 403, the memory module 110 tracks page meta of a memory page.

In step 404, the memory module 110 performs, for the memory page, inter-memory tiering between the tier 1 memory 105 and the memory module 110 or intra-memory tiering between the tier 2 memory 112 and the tier 3 memory 113, based on the first configuration or the second configuration, respectively, and the tracked page meta.

In accordance with the above-described embodiments, a configuration of multiple memory hierarchies in memory modules, e.g., CMMs, can further optimize TCO by using inexpensive memory such as NAND.

In addition, the above-described embodiments improve the computing capabilities of a host system (host CPU) or embedded CPU by reducing operational overhead related to memory tiering, such as page tracking for hot/cold classification.

Although embodiments have been described above with reference to the CXL memory standard as an example, the present disclosure is not limited thereto, and various embodiments of the disclosure may also be applicable to other memory standards as well.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A system for perform inter/intra-memory tiering, the system comprising:

a host central processing unit (CPU);

a tier 1 memory; and a memory module comprising an embedded CPU, a tier 2 memory, and a tier 3 memory, wherein the memory module is configured to:

receive, from the host CPU, an inter-memory tiering configuration, receive, from the embedded CPU, an intra-memory tiering configuration, perform inter-memory tiering between the tier 1 memory and the memory module, based on the inter-memory tiering configuration, and perform intra-memory tiering between the tier 2 memory and the tier 3 memory, based on the intra-memory tiering configuration.

2. The system of claim 1, wherein the inter-memory tiering between the tier 1 memory and the memory module comprises at least one of:

page promotion from the memory module to the tier 1 memory, or page demotion from the tier 1 memory to the memory module.

3. The system of claim 1, wherein the intra-memory tiering between the tier 2 memory and the tier 3 memory comprises at least one of:

page promotion from the tier 3 memory to the tier 2 memory, and page demotion from the tier 2 memory to the tier 3 memory.

4. The system of claim 1, wherein the memory module further comprises a memory tiering module configured to:

track page meta of a memory page based on the inter-memory tiering configuration, and classify the memory page as one of hot or warm based on the tracked paged meta, wherein the memory page is classified as hot when a workload characteristic is above a first threshold, the memory page is classified as cold when the workload characteristic is below a second threshold, and the memory page is classified as warm when the workload characteristic is above a third threshold.

5. The system of claim 4, wherein the memory tiering module is further configured to, if the memory page is classified as hot, report the hot page to the host CPU.

6. The system of claim 4, wherein the page meta comprises at least one of access frequency or recency.

7. The system of claim 1, wherein the memory module further comprises:

a memory tiering module configured to:

track page meta of a memory page based on the intra-memory tiering configuration, and classify the memory page as one of hot, warm, or cold based on the tracked paged meta, wherein the memory page is classified as hot when a workload characteristic is above a first threshold, the memory page is classified as cold when the workload characteristic is below a second threshold, and the memory page is classified as warm when the workload characteristic is above a third threshold.

8. The system of claim 7, wherein the memory tiering module is further configured to, if the memory page is classified as hot, report the hot page to the host CPU.

9. The system of claim 7, wherein the page meta comprises at least one of access frequency or recency.

10. The system of claim 7, wherein the memory tiering module is further configured to, if the memory page is classified as warm, move the memory page from the from the tier 3 memory to the tier 2 memory.

11. The system of claim 7, wherein the memory tiering module is further configured to, if the memory page is classified as cold, move the memory page from the from the tier 2 memory to the tier 3 memory.

12. The system of claim 7, wherein the memory tiering module comprises:

a page tracking module configured to track the page meta of the memory page;

a memory manager module configured to control page migration between the tier 2 memory and the tier 3 memory;

a cache configured to manage data located to the tier 2 memory; and a memory to input/output (IO) (M2I) mapping module configured to manage mapping between memory and solid state device (SSD) addresses.

13. The system of claim 1, wherein the memory module further comprises a tier 1 candidate memory.

14. The system of claim 13, wherein the memory module is further configured to:

remove a memory page identified as hot from the tier 2 memory or the tier 3 memory, and temporarily store the memory page in the tier 1 candidate memory prior to being hot promoted to the tier 1 memory, wherein a hot page is a memory page with a workload characteristic above a first threshold.

15. The system of claim 13, wherein the tier 1 candidate memory comprises static random access memory (SRAM).

16. The system of claim 1, wherein the memory module comprises a compute express link (CXL) memory module (CMM).

17. The system of claim 1, wherein the tier 3 memory comprises NAND flash memory.

18. The system of claim 1, wherein the tier 1 memory comprises dynamic random access memory (DRAM).

19. The system of claim 1, wherein the tier 2 memory comprises dynamic random access memory (DRAM).

20. A method of inter/intra-memory tiering by a memory module, the method comprising:

receiving, from a host central processing unit (CPU), a first configuration for inter-memory tiering between a tier 1 memory and the memory module;

receiving, from a CPU included in the memory module, a second configuration for intra-memory tiering between a tier 2 memory and a tier 3 memory, the tier 2 memory and the tier 3 memory being included in the memory module;

tracking page meta of a memory page; and performing, for the memory page, one of inter-memory tiering between the tier 1 memory and the memory module, or intra-memory tiering between the tier 2 memory and the tier 3 memory, based on the first configuration or the second configuration, respectively, and the tracked page meta.

* * * * *